United States Patent
Woundy et al.

(10) Patent No.: US 10,263,860 B2
(45) Date of Patent: *Apr. 16, 2019

(54) MANAGEMENT OF SHARED ACCESS NETWORK

(75) Inventors: Richard Woundy, North Reading, MA (US); Chris Bastian, Glenmore, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/170,245

(22) Filed: Jun. 28, 2011

(65) Prior Publication Data

US 2011/0258324 A1    Oct. 20, 2011

Related U.S. Application Data

(63) Continuation of application No. 12/480,009, filed on Jun. 8, 2009, now Pat. No. 7,996,526.

(51) Int. Cl.
*G06F 15/16* (2006.01)
*H04L 12/24* (2006.01)
(Continued)

(52) U.S. Cl.
CPC .... *H04L 41/5054* (2013.01); *H04L 29/08072* (2013.01); *H04L 41/0893* (2013.01);
(Continued)

(58) Field of Classification Search
CPC .... H04L 29/08072; H04L 29/06; H04L 43/06
(Continued)

(56) References Cited

U.S. PATENT DOCUMENTS 6,418,477 B1   7/2002   Verma
6,505,234 B1   1/2003   Riddle
(Continued)

FOREIGN PATENT DOCUMENTS

| EP | 2262170 A1 | 12/2010 |
|---|---|---|
| WO | 02/41642 A2 | 5/2002 |
| WO | 2008025157 | 3/2008 |

OTHER PUBLICATIONS

Clark, et al., "An Introduction to Policy Management", BT Technology Journal, Kluwer Academic Publishers, vol. 23, No. 2, Apr. 1, 2005.
(Continued)

*Primary Examiner* — Khanh Q Dinh
(74) *Attorney, Agent, or Firm* — Banner & Witcoff, Ltd.

(57) ABSTRACT

Information from multiple sources can be communicated to a policy server. Based on that information, the policy server can determine allocation of bandwidth, transmission priority and/or other network resources based on preferences and/or service selections provided by a subscriber and communicate information about those determinations to other network elements for policy implementation. The information provided to a policy server for determining network resource allocation can include information about one or more applications executing at a customer equipment device, information about access network bandwidth usage, information about services for which one or more devices is authorized, and/or information about network conditions.

20 Claims, 5 Drawing Sheets

(51) Int. Cl.
*H04L 29/08* (2006.01)
*H04L 29/06* (2006.01)

(52) U.S. Cl.
CPC .......... *H04L 41/5022* (2013.01); *H04L 29/06* (2013.01); *H04L 41/18* (2013.01)

(58) Field of Classification Search
USPC ........................................ 709/220, 224, 226
See application file for complete search history.

(56) References Cited

U.S. PATENT DOCUMENTS

| | | | |
|---|---|---|---|
| 6,629,081 B1* | 9/2003 | Cornelius et al. | 705/30 |
| 6,640,248 B1 | 10/2003 | Jorgensen | |
| 6,950,434 B1 | 9/2005 | Viswanath et al. | |
| 6,963,547 B1 | 11/2005 | Kwak et al. | |
| 6,971,108 B1 | 11/2005 | Clark et al. | |
| 6,980,555 B2* | 12/2005 | Mar | 370/395.21 |
| 7,124,101 B1* | 10/2006 | Mikurak | 705/35 |
| 7,167,844 B1* | 1/2007 | Leong | G06Q 30/04 705/37 |
| 7,367,740 B2 | 5/2008 | Lazio et al. | |
| 7,483,996 B2 | 1/2009 | Townsley et al. | |
| 7,568,040 B2 | 7/2009 | Townsley et al. | |
| 7,610,233 B1* | 10/2009 | Leong | G06Q 10/087 705/26.3 |
| 7,885,644 B2 | 2/2011 | Gallagher et al. | |
| 7,908,395 B1* | 3/2011 | Salkewicz | 709/238 |
| 7,996,526 B2* | 8/2011 | Woundy et al. | 709/224 |
| 8,892,665 B1* | 11/2014 | Rostami-Hesarsorkh | H04L 29/06557 709/206 |
| 9,088,995 B2* | 7/2015 | Novak | H04W 36/06 |
| 9,721,086 B2* | 8/2017 | Shear | G06F 21/45 |
| 9,971,894 B2* | 5/2018 | Shear | G06F 21/45 |
| 2002/0055990 A1 | 5/2002 | Vaman et al. | |
| 2002/0116638 A1* | 8/2002 | Dobes et al. | 713/201 |
| 2003/0185239 A1 | 10/2003 | Miller et al. | |
| 2003/0212999 A1 | 11/2003 | Cai | |
| 2003/0219022 A1 | 11/2003 | Dillon et al. | |
| 2006/0143710 A1 | 6/2006 | Desai et al. | |
| 2006/0268716 A1 | 11/2006 | Wijting et al. | |
| 2007/0041373 A1 | 2/2007 | Lor et al. | |
| 2007/0050502 A1 | 3/2007 | Barker | |
| 2007/0061433 A1 | 3/2007 | Reynolds et al. | |
| 2007/0180119 A1* | 8/2007 | Khivesara | H04L 12/1881 709/226 |
| 2007/0226775 A1 | 9/2007 | Andreasen et al. | |
| 2008/0046963 A1* | 2/2008 | Grayson et al. | 726/1 |
| 2009/0041058 A1 | 2/2009 | Ikeda et al. | |
| 2009/0086688 A1 | 4/2009 | Kvache et al. | |
| 2010/0115095 A1* | 5/2010 | Zhu et al. | 709/226 |
| 2010/0192212 A1 | 7/2010 | Raleigh | |
| 2010/0246436 A1 | 9/2010 | Yang et al. | |
| 2010/0312892 A1 | 12/2010 | Woundy et al. | |
| 2011/0004683 A1 | 1/2011 | Kottomtharayil et al. | |
| 2011/0016479 A1 | 1/2011 | Tidwell et al. | |
| 2011/0142042 A1 | 6/2011 | Field | |
| 2011/0225113 A1 | 9/2011 | Mann | |
| 2012/0144063 A1 | 6/2012 | Menchaca et al. | |
| 2012/0195418 A1 | 8/2012 | Riddle | |
| 2013/0024901 A1 | 1/2013 | Sharif-Ahmadi et al. | |
| 2013/0209730 A1 | 8/2013 | Barker et al. | |
| 2015/0033305 A1* | 1/2015 | Shear | G06F 21/45 726/11 |
| 2015/0101013 A1* | 4/2015 | Rostami-Hesarsorkh | H04L 29/06557 726/1 |

OTHER PUBLICATIONS

European Search Report for EP10164358 dated Jul. 15, 2010.
Canadian Office Action—CA App. 2,706,216—dated Feb. 13, 2017.
Canadian Office Action—CA Appl. 2,706,216—dated Apr. 11, 2016.
European Office Action—EP App. 12177077.0—dated Oct. 5, 2016.
"HG1 Guideline Document: QoS White Paper", Home Gateway Initiative, pp. 1-31, Jun. 26, 2009.
Extended European Search Report—EP 12177077.0—dated Dec. 5, 2013.
Mar. 16, 2018—European Office Action—EP 12177077.0.
Jul. 7, 2017—European Office Action—EP 12177077.0.
Apr. 20, 2018—Canadian Office Action—CA 2,781,422.
Prioritizing Local and Network Traffic, U.S. Appl. No. 14/603,047, filed Jan. 22, 2015.
Jan. 28, 2019—European Office Action—EP 12177077.0.

* cited by examiner

| Acct ID | AD1 MAC | AD2 MAC | ··· | CE1 MAC | CE2 MAC | ··· | IP ver | BWup | BWdn | TE | ··· | U | ··· | X | ··· |
|---|---|---|---|---|---|---|---|---|---|---|---|---|---|---|---|
| | | | | | | | | | | | | | | | |
| ··· | ··· | ··· | ··· | ··· | ··· | ··· | ··· | ··· | ··· | ··· | ··· | ··· | ··· | ··· | ··· |
| | | | | | | | | | | | | | | | |

| Acct ID | AD MAC | AD IPaddr | CE1 MAC | CE1 IPaddr | CE2 MAC | CE2 IPaddr | ··· | Flow ID | Dir | Bytes Tr | Pkts Fwd | Pkts Del | Pkts Dsc |
|---|---|---|---|---|---|---|---|---|---|---|---|---|---|
| | | | | | | | | | | | | | |
| | | | | | | | | | | | | | |
| ··· | ··· | ··· | ··· | ··· | ··· | ··· | ··· | ··· | ··· | ··· | ··· | ··· | ··· |
| | | | | | | | | | | | | | |

MANAGEMENT OF SHARED ACCESS NETWORK

CROSS-REFERENCE TO RELATED APPLICATIONS

This application is a continuation of U.S. patent application Ser. No. 12/480,009, titled "Management of Shared Access Network" and filed Jun. 8, 2009, which is incorporated in its entirety by reference herein.

BACKGROUND

It is now common for persons in homes and businesses to send and receive data through a connection to one or more high speed data networks. For example, various telecommunications operators provide High-Speed Internet (HSI) service to subscribing customers. The number of HSI customers is growing, and many customers are using HSI service for longer periods and/or for more purposes. Although many operators have systems with very substantial capacity, network bandwidth remains a finite resource that must be shared among numerous subscribers. Other network resources that must be shared by those numerous subscribers include routers, gateways, servers and other discrete network elements, physical and/or logical ports at such network elements, cables (optical, coaxial, or otherwise) interconnecting network elements, etc.

Because most network resources are finite, system operators often develop sets of rules to determine which users and/or services are allowed to use various resources, which users and/or services receive priority, etc. These rule sets, or "policies," have conventionally been based on isolated aspects of network operation. As a result, conflicts between policies can occur.

SUMMARY

This Summary is provided to introduce a selection of concepts in a simplified form that are further described below in the Detailed Description. This Summary is not intended to identify key features or essential features of the invention.

In at least some embodiments, information from multiple sources is communicated to a policy server. Based on that information, the policy server determines allocation of bandwidth, transmission priority and/or other network resources based on preferences and/or service selections provided by a subscriber and communicates information about those determinations to other network elements for policy implementation. In at least some embodiments, the information provided to a policy server for determining network resource allocation includes information about one or more applications executing at a customer equipment device, information about access network bandwidth usage, information about services for which one or more devices is authorized, and/or information about network conditions.

BRIEF DESCRIPTION OF THE DRAWINGS

Some embodiments of the present invention are illustrated by way of example, and not by way of limitation, in the figures of the accompanying drawings and in which like reference numerals refer to similar elements.

FIG. 2A is an example of a database table stored in a memory of a provisioning system server according to at least some embodiments.

FIG. 2B is an example of a database table stored in a memory of an Internet Protocol Data Record server according to at least some embodiments.

DETAILED DESCRIPTION

Some embodiments are described in the context of services provided to subscribers over access networks utilizing communication protocols described in one or more Data-Over-Cable Service Interface Specifications (DOCSIS) standards. Said standards are known in the art and available from Cable Television Laboratories, Inc. (CableLabs®) of Louisville, Colo. However, the invention is not limited to networks using a specific type of communication protocol or a specific physical communication medium.

Figure 1:
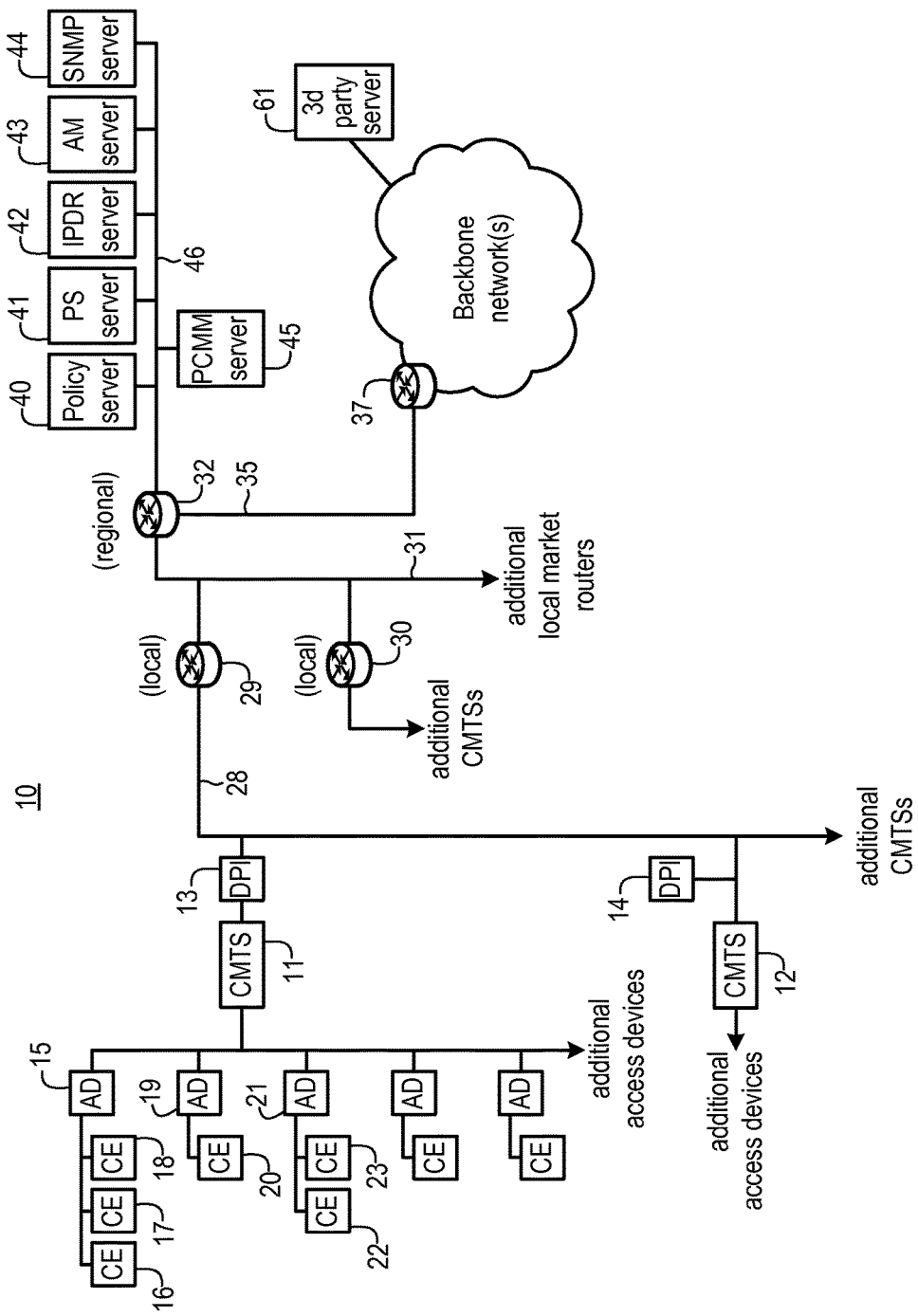
FIG. 1 is a diagram of a network that includes devices configured to implement network management techniques according to at least some embodiments.

FIG. 1 is a diagram of a network 10 that includes devices configured to implement network management techniques according to at least some embodiments. Network 10 is a nationwide high speed data network that includes multiple access networks serving individual subscribers over hybrid fiber coaxial (HFC) plants and operated in accordance with one or more DOCSIS protocols. Network 10 provides High-Speed Internet (HSI) data service and other services (e.g., cable television, Voice over IP (VoIP) telephone service) to subscribing customers. Typically, each subscriber location has one or more types of subscriber access device (AD) that is used to communicate data from customer equipment devices (CE) at subscriber locations to other points in network 10 (and/or to points in other networks via network 10), and vice versa. Examples of customer equipment devices include, but are not limited to, personal computers (PC), other types of computers, gaming consoles, video and/or voice communication terminals, etc. Examples of access devices include, but are not limited to, cable modems, set top terminals, Media Terminal Adapters (MTA), etc.

Cable Modem Termination System (CMTS) 11 communicates with access devices in an access network portion of network 10. Although FIG. 1 only shows five access devices in the access network served by CMTS 11, the presence of additional access devices is indicated by an arrow. Similarly, CMTS 12 communicates with multiple access devices in a separate access network portion of network 10. As previously indicated, the access networks of CMTSs 11 and 12 are HFC DOCSIS networks. For convenience, optical nodes, splitters, amplifiers, and other elements between CMTSs 11 and 12 and the access devices in their respective access networks are not shown in FIG. 1. Each CMTS forwards upstream communications from the access devices in its access network to other points in network 10, forwards data from other network 10 locations downstream to those access devices, and controls the ability of each access device in its access network to communicate with network 10. CMTSs 11 and 12, as well as additional CMTSs (not shown), communicate over optical fibers 28 with a local market router 29. Local market router 29, together with local market router 30 serving additional CMTSs (not shown in FIG. 1) and additional local market routers serving other CMTSs (also not shown) communicate over optical fibers 31 with a regional router 32. Regional router 32 communicates over optical fiber 35 with a backbone network router 37. Although not shown in FIG. 1, additional regional routers (with associated local routers, CMTSs, etc.) communicate with backbone network router 37 or other backbone network routers.

Also shown in FIG. 1 are a policy server 40, a provisioning system (PS) server 41, an Internet Protocol Data Record (IPDR) server 42, an application management (AM) server 43, a Simple Network Management Protocol (SNMP) server 44 and a PacketCable Multimedia (PCMM) server 45 that communicate with each other and with other network 10 elements via Gigabit Ethernet links 46 with regional router 32. Deep Packet Inspection (DPI) devices 13 and 14 are associated with CMTSs 11 and 12, respectively, and are described more fully below. Remaining elements in FIG. 1 are discussed below.

So as to avoid unnecessary drawing complexity, only a small number of network elements are shown in FIG. 1. Numerous additional routers, CMTSs, optical nodes, servers subscriber devices, etc., would be present in an actual network. Each of servers 40, 41, 42, 43, 44 and 45 and DPI devices 13 and 14 is a computing platform having processors and memories storing instructions for operation as described herein, as well as network interface hardware to facilitate communication with other network elements. Although illustrated as separate devices, the operations and functions of servers 40, 41, 42, 43, 44 and 45 and of DPI devices 13 and 14 could be combined into fewer, or distributed across more, computing platforms.

Each of the CE devices shown in FIG. 1 executes (or is configured to execute) one or more application programs that communicate data across network 10. For example, some PCs or other computers execute web browser applications with which users of those computers access web sites and other services available on the Internet. Other computers execute various other types of application programs that transmit and receive data through network 10 via a cable modem or other type of subscriber access device. Examples of such programs include file sharing programs, games, email clients, clients for viewing IP television (IPTV) program content, streaming video applications, photo upload programs, network-based backup services, VoIP, etc. Some or all these various applications programs executing on CE devices communicate application data in Internet Protocol (IP) packets. Those application data IP packets may be further encapsulated in packets according to other protocols at different levels of the Open System Interconnection (OSI) reference model prior to transmission by a cable modem or other access device. Similarly, data received by an access device from a CMTS in network 10 may require one or more levels of decapsulation to expose incoming application data IP packets.

Policy server 40 receives information from multiple sources within network 10. That information includes information regarding applications executed by CE devices associated with various subscribers, information regarding subscriber accounts, information regarding conditions in various network locations, and other types of information. Based on received information, policy server 40 makes policy decisions about allocation of access network bandwidth and/or other network resources. Policy server 40 then communicates information about those decisions to other network devices so that the appropriate policies can be implemented.

Provisioning system server 41 is one source of information input to policy server 40. Provisioning system server 41 configures cable modems and other subscriber access devices so as to control the services available to CE devices communicating through those access devices. In some cases, provisioning system server 41 may also configure CE devices. Provisioning system server 41 can configure a subscriber access device or CE device using any of various techniques (e.g., by downloading a configuration file as a part of an initialization or rebooting process, in real time in response to a pending request for a service, etc.).

As part of its operations, provisioning system server 41 maintains a database of permitted services and other configuration data for subscriber access devices receiving (or that may receive) HSI services in network 10. FIG. 2A shows an example of such a database in the form of a table 101. In some embodiments, one or more tables similar to table 101 are maintained in a memory of provisioning system server 41. The tables of FIGS. 2A and of 2B (discussed below) are merely examples of how data can be arranged in accordance with some embodiments. The actual format of data and/or of the tables or other data structures used to organize that data will vary among different embodiments. For example, databases corresponding to the tables of FIGS. 2A and 2B could be normalized, distributed throughout different tables, etc., as may be required in connection with a desired implementation. So as to avoid unnecessary detail in the drawings, various fields in the tables of FIGS. 2A and 2B are left blank where the type of data placed in one of those fields is described herein. Vertical ellipses in the tables of FIGS. 2A and 2B indicate an arbitrary number of additional cells in a particular column.

Each row in table 101 has fields holding provisioning data for a single subscriber account. In some embodiments, a subscriber is a person, corporation or other entity that has arranged to obtain access to, and one or more services from, network 10. Such arrangements typically, though not necessarily, involve a fee. An account is a construct used to group various data items related to providing a subscriber with services in network 10. For example, a particular subscriber account in some embodiments corresponds to one or more specific access devices used to communicate with a CMTS of network 10, one or more services permitted for those access devices, and various other data as described below. An account may also correspond to a specific geographic address or other permanent location to which services are provided (e.g., an address where an HFC plant coaxial cable drop terminates), though this need not be the case. A user is an entity actually using an application program to communicate with network 10. A user will typically be a person, but this is also not mandatory. A user may also, but need not, be a subscriber.

The first column of table 101 ("Acct ID") holds unique subscriber account identifiers. Each field in the "AD1 MAC" column holds a media access control (MAC) address uniquely identifying a cable modem or other access device corresponding to a subscriber account. MAC addresses for additional access devices (if any) associated with an account are placed in fields of successive columns. Although only one such successive column is shown ("AD2 MAC"), the presence of additional AD MAC columns is indicated by a horizontal ellipsis. Each field in the "CE1 MAC" column holds a MAC address for a customer equipment device corresponding to a subscriber account. MAC addresses for additional customer equipment devices (if any) can be held in successive columns ("CE2 MAC", etc., with a horizontal ellipsis indicating the presence of additional similar columns). Each field in the "IP ver" column holds a value for the Internet Protocol version (e.g., IPv4 or IPv6) used by devices corresponding to a subscriber account. Each field in the "BWup" column holds a value for provisioned upstream bandwidth corresponding to a subscriber account. Each field in the "BWdn" column holds a value for provisioned downstream bandwidth corresponding to a subscriber account. In some embodiments, certain types of upstream and downstream communications from a subscriber are limited to certain maximum data communication rates. For example, one subscriber paying a basic rate may be authorized to download certain kinds of data at 6 megabits per second (Mbps) and upload certain types of data at 1 Mbps, while another subscriber paying a slightly higher fee may be authorized to download certain kinds of data at 8 megabits per second (Mbps) and upload certain types of data at 2 Mbps. Each field in the "TE" column holds a value indicating whether a provisioned downstream data rate can be exceeded for a brief period of time to, e.g., download the initial portion of a web page or streaming video. In some embodiments, table 101 may also include IP addresses such as are described in connection with FIG. 2B.

Subsequent fields in table 101 hold values that indicate whether a particular subscriber is authorized to receive a particular service. For example, the "U" and "X" columns represent services that are discussed below in connection with various examples. The presence of an arbitrary number of additional columns for additional services is indicated by horizontal ellipses before and after the "U" and "X" columns. Each of the fields in the service columns may, in addition to an indicator of whether a subscriber account is authorized to receive a service, include information about the specifics of that service and/or configuration information for a CE and/or access device when that service is provided. In at least some embodiments, data in table 101 regarding services for which a particular subscriber is authorized are input as a result of service selections made by a subscriber over a web portal (described below) or otherwise provided by the subscriber to the operator of network 10. Similarly, configuration data in table 101 for subscriber-selected services (e.g., prioritization of subscriber data communication for such services) is also based on selections and choices input by the subscriber over a web portal or otherwise provided to the network 10 operator.

Returning to FIG. 1, IPDR server 42 receives reports from access devices or other network elements (e.g., CMTSs) and stores information regarding amounts of data transmitted to and received from individual access devices. FIG. 2B shows one example of a table 102 used (in some embodiments) to store such information in a database maintained in a memory of IPDR server 42. Each row in table 102 has fields holding information about data communications associated with a specific subscriber account. As discussed below, a single subscriber account may have more than one row in table 102 (and/or in other tables similar to table 102). The first column of table 102 ("Acct ID") holds unique subscriber account identifiers. Each field in the "AD MAC" column holds a MAC address uniquely identifying an access device corresponding to a subscriber account. If there are multiple access devices that correspond to a subscriber account (e.g., a subscriber has multiple authorized cable modems, a cable modem and an MTA, etc.), table 102 may have a separate row for each access device. Each field in the "AD IPaddr" column holds an IP address for an access device having its MAC address on the same row. Each field in the "CE1 MAC" column holds a MAC address for a CE device currently communicating with network 10 through the access device identified on the same row. Each field in the CE1 IPaddr column holds an IP address for the CE device having its MAC address in the CE1 MAC column on the same row. Additional columns (indicated generically by a horizontal ellipsis) have fields holding MAC and IP addresses for additional CE devices communicating through a particular access device.

Each field in the "Flow ID" column holds an identifier for a DOCSIS service flow established between the access having its MAC address on the same row and the CMTS serving the access network of that access device. The "Dir" column holds a value indicating whether other information in the row (discussed below) relates to upstream communications from the access device or downstream communications to the access device. Each field in the "Bytes Tr" column holds a values indicative of the number of bytes transmitted to or received from an access device having its MAC address on the same row in a preceding time period (e.g., in the previous minute). In a similar manner, fields in the "Pkts Fwd," "Pkts Del" and "Pkts Dsc" holds values indicative of the number of packets from (or to) an access devices in the same preceding period that have been forwarded, delayed or discarded. Separate versions of table 102 for earlier time periods may be stored so as to construct a history for a particular access device. For example, the number of bytes sent by an access device in the preceding 15 minutes could be determined by consulting a current version of table 102 and by consulting 14 stored earlier versions of table 102 respectively corresponding to the immediately preceding 14 minutes.

In at least some embodiments, each subscriber account will have a separate row in table 102 for each unique combination of subscriber account, AD MAC, Flow ID and Dir values. For example, a subscriber account having Acct ID "S1" with a single cable modem having MAC address "CM1" and separate upstream and downstream flows FLup1 and FLdn1 would have two rows in table 102: {S1 . . . CM1 . . . FLup1 . . . Up . . . } and {S1 . . . CM1 . . . FLdn1 . . . Dn . . . }. For subscriber accounts with multiple CE devices communicating through a particular access device, table 102 could also include separate subfields in the Bytes Tr, Pkts Fwd, Pkts Del and Pkts Dsc columns to hold values that indicate the amount of transmitted bytes attributable to a each CE device, the amount of forwarded packets attributable to each CE device, etc. Alternately, separate rows could be inserted into table 102 for CE devices on a particular access device.

Returning to FIG. 1, DPI devices 13 and 14 are located at and associated with CMTSs 11 and 12, respectively. Each of DPI device 13 and 14 examines application data IP packets and determines applications that created those packets. As explained above, an application executing on a CE device will typically encapsulate outgoing application data in an IP packet. The CE device then communicates that data to an access device for upstream transmission to a CMTS of network 10. The CE device and/or the access device may further encapsulate the application data IP packet into (and segment the application data IP packet across) packets according to protocols at other layers of the OSI reference model. For purposes of illustration, two types of DPI devices are shown in FIG. 1. DPI device 13 is an active DPI device. In particular, data flows between CMTS 11 and local router 29 or other upstream element flows through DPI device 13. Accordingly, DPI device 13 is able to affect such flows by prioritizing communications for various applications in accordance with subscriber defined preferences. DPI device 14 is a passive DPI device and makes determinations about data packets flowing between CMTS 12 and upstream elements of network 10, but is not able to affect such data flows.

Upon receiving an application data IP packet from an access device, a DPI device examines the IP header data in the packet and compares that data to one or more application signature files. Based on that comparison, the DPI device can determine what application created the IP packet. In at least some embodiments, a DPI device can determine any active application such as a file sharing application, a streaming video application, a photo upload application, a web browsing application, etc. As but one example, a DPI device may determine that a particular destination address corresponds to a server that is accessed in connection with several types of game applications. The DPI device may then determine that a specific one of those game applications is indicated by a particular value in the Protocol field of an IPv4 packet (or in the "next header" field and one or more extension fields of an IPv6 packet). As another example, a DPI device can examine a TCP or UDP port number and determine the active application based on that port number. In at least some embodiments, and so as to maintain subscriber privacy, a DPI device only examines header fields of an IPv4 or IPv6 packet and does not examine any of the actual application data (or other data) that may be carried in the payload data field of an IP packet. In at least some such embodiments, determinations of active applications are only made so as to implement subscriber-defined preferences, and those determinations are not used for any other purpose and records of such determinations are not retained any longer than is necessary to implement those subscriber-defined preferences.

A DPI device need not maintain signature files matching every conceivable type of application that a subscriber might use. Instead, DPI devices in some embodiments identify applications for which some action might be taken by policy server 40. A DPI device could simply ignore IP packets having headers that do not match an application in the application signatures files of that DPI device. In some embodiments, each of DPI devices 13 and 14 maintains its own copy of an application signature database and forwards information about an identified application to policy server 40. In other embodiments, a DPI device simply extracts the information from one or more IP packet header fields and forwards that extracted information to policy server 40. Policy server 40 then compares that information with application signature files to identify an application.

Based on information in the header of an application data IP packet, and/or information in header(s) of one or more additional packets encapsulating that IP packet, a DPI device can also determine the access device sending the IP packet. The DPI device may in some embodiments also determine the CE device executing the application that generated the IP packet. Information regarding the access device and/or CE device is also provided to policy server 40.

In at least some embodiments, information about individual application programs is also stored in a database maintained in a memory of application management server 43. In some embodiments, application management server 43 can be implemented using a Bandwidth on Demand (BOD) application manager (available from Camiant, Inc. of Marlborough, Mass.) having additional programming to carry out operations such as are described herein. In some cases, the application information in server 43 may relate to the performance preferences and/or needs of an application program executing on a CE device. For example, a game application executing on computer or game console may require real-time communications with a game server, and thus be sensitive to latency, jitter and packet loss. However, that same application may only transfer small amounts of data, and thus not require large amounts of bandwidth. Conversely, a file sharing application may consume a large amount of bandwidth for bulk data transfers but be less sensitive to minor delays. Still other applications (e.g., streaming video content) may require large data transfers and be sensitive to certain types of delay.

In addition to information about preferences and/or requirements for individual application programs, application management server 43 may also store information regarding the preferences and/or needs of a third party providing services in connection with a particular application. Returning to the game application example, a provider operating a game server for that application may transmit information to application management server 43 about the total number of subscribers currently accessing the game server, the regions in which those subscribers are distributed, and the overall bandwidth needed to accommodate those subscribers' use of the game server. That same game provider may also operate "mirror" game servers and have the ability to serve individual game playing users from any of those servers. However, the game provider may also serve game players outside of network 10, and an operator of network 10 may thus not know the current load levels of each mirror server. Accordingly, the game provider could periodically transmit information about each mirror server's load state to application management server 43 so that communications with game players in network 10 can be routed to different servers if appropriate.

SNMP server 44 receives information about load levels for CMTSs, routers and other network elements, information about device outages, and other information regarding the conditions of various elements throughout network 10. For example, SNMP server 44 may receive and store information about the amount of packets and/or bytes received and transmitted over various router interfaces in network 10. Information maintained by SNMP server 44 may also be accessed by policy server 40.

Figure 3:
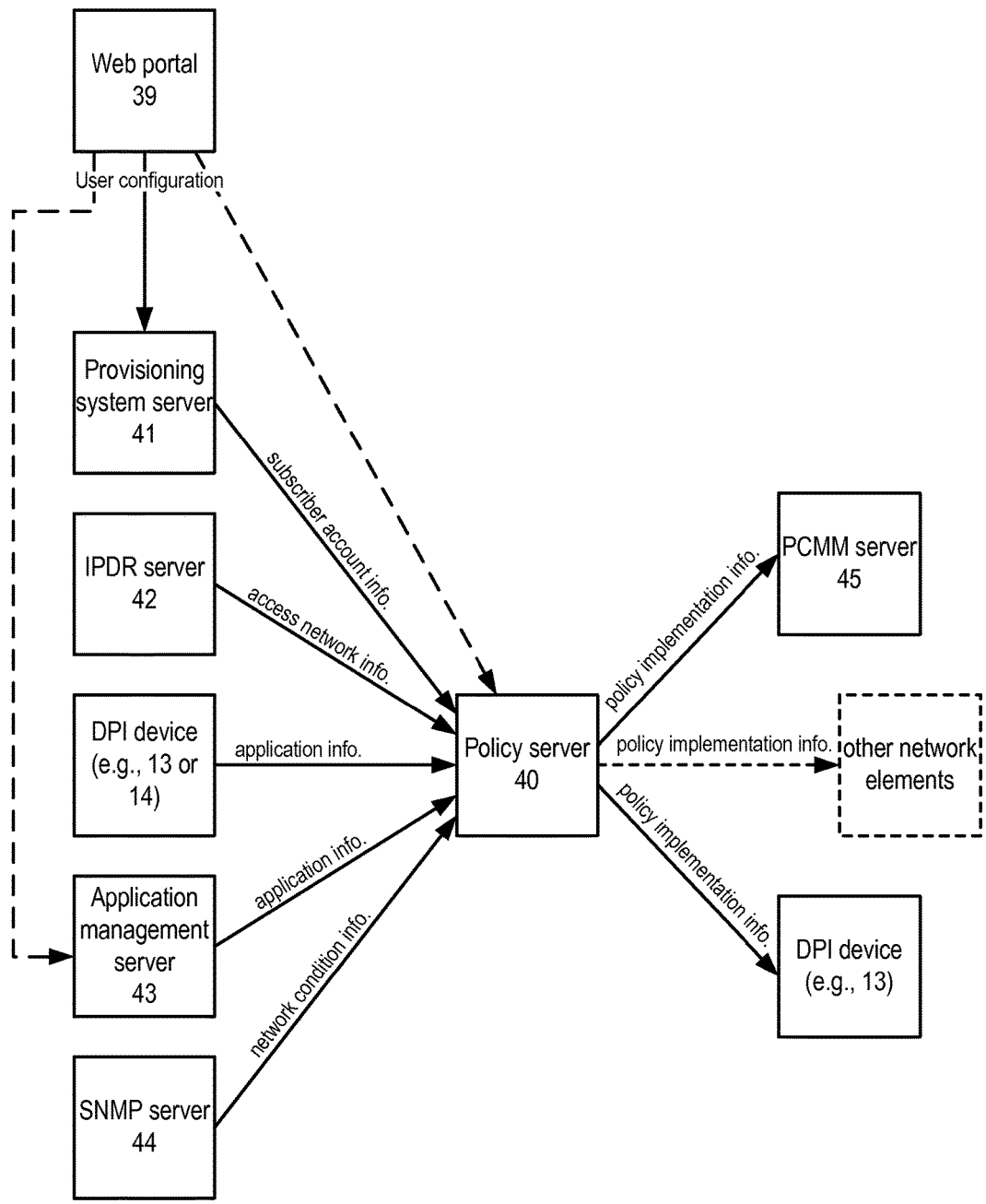
FIG. 3 is a block diagram explaining information flows to and from a policy server according to at least some embodiments.

As indicated above, policy server 40 receives information from multiple sources within network 10, makes policy decisions about allocation of access network bandwidth and/or other network resources based on that received information, and communicates information about those decisions to other network devices. FIG. 3 is a block diagram explaining information flows to and from policy server 40 according to at least some embodiments. A subscriber (or an individual user associated with a subscriber) provides input through web portal 39 to select services, set preferences and/or priorities and/or otherwise configure services, etc. The resulting user-defined configuration data is provided via one or more intermediate network elements (not shown) to provisioning system server 41, application management server 43 and/or policy server 40. In other embodiments, subscriber input is received in another manner (e.g., entry by a customer service representative receiving subscriber input by telephone). Provisioning system server 41 provides subscriber account information (e.g., information about services and/or devices associated with an account) to policy server 40. IPDR server 42 provides information about bandwidth usage by access devices corresponding to a subscriber account. A DPI device from a subscriber's access network provides information about applications executed by CE devices corresponding to a subscriber account. Application management server 43 also provides information about applications executed by such devices and/or regarding network resources related to such applications. SNMP server 44 provides status information about various elements in network 10.

After making decisions based on information received from various sources, policy server 40 communicates information about those decisions to one or more network elements. In some cases, policy server 40 will forward instructions to PCMM server 45 over a Common Open Policy Service (COPS) interface. In response to those instructions, PCMM server 45 will forward instructions (e.g., a PCMM Gate-Set request message) to a CMTS that cause the CMTS to change the manner in which data communications from or to an access device are managed. In some embodiments, two basic flow treatments sent from policy server 40 to a CMTS include a change in flow priority and setting a maximum or minimum bandwidth cap. Policy server 40 may also forward instructions to an active DPI device such as device 13 for purposes of network management; that active DPI device may be the same device that provided the application data to policy server 40 used to make a policy decision. In response to messages from policy server 40, for example, DPI device 13 may reprioritize data flows so as to implement a subscriber-requested preference. DPI device 13 could effect such reprioritization by use of different data forwarding queues within DPI device 13 and/or by adjusting priority markings in a packet header (e.g., the DiffServ field of an IP packet header). Policy server 40 may also communicate with routers and/or various other network devices (shown generically in broken lines) to implement policy determinations.

FIG. 3 does not illustrate all aspects of all embodiments. In some embodiments, for example, policy server 40 may receive information inputs from sources other than those shown on the left side of FIG. 3. In some cases, policy server 40 may only receive information from some of the sources shown (e.g., only from a provisioning server, a DPI device and an IPDR server). There might also be multiple provisioning system servers, multiple IPDR servers, etc. providing information regarding a single subscriber account. Policy server 40 might also send communications other than policy-implementation communications (e.g., queries) to a provisioning server, IPDR server, DPI device, application management server, SNMP server, or other device.

As but one example of policy server 40 operation in one embodiment, assume that CE device 16 (FIG. 1) is a personal computer (PC) executing a game application program ("application X") and an email application program ("application Y"), and that CE device 17 is another PC executing a web browser ("application Z"). CE/PC 16 communicates data for applications X and Y, and CE/PC 17 communicates data for application Z, via cable modem access device (AD/CM) 15. Further assume that subscriber A corresponding to AD/CM 15 has made arrangements with the operator of network 10 to receive a gaming service ("service X") in which communications for application X receive priority over communications for other applications that might also be running on CE/PC 16, CE/PC 17, CE 18 or other CE devices communicating with CMTS 11 through AD/CM 15. Accordingly, the field in the "X" column of table 101 (FIG. 2A) corresponding to the subscriber A account would include an indicator that the subscriber is authorized to receive service X.

When CE/PC 16 initially begins executing application X, one or more IP packets containing application X data are sent by CE/PC 16, via AD/CM 15, addressed to game server 61 operated by a third party game provider. When those IP packets are received at CMTS 11, DPI device 13 examines one or more fields in the headers and determines that the packets are associated with application X. DPI device 13 then communicates to policy server 40 that application X is executing on a device communicating through AD/CM 15. DPI device 13 may also inform policy server 40 of the specific device (CE/PC 16) on which application X is running DPI device 13 also examines headers in IP packets originating from applications Y and Z and provides similar information about those applications to policy server 40.

Policy server 40 then queries IPDR server 42 and receives information regarding how much bandwidth is being consumed by applications X, Y and Z in the upstream and/or downstream channels between AD/CM 15 and CMTS 11. IPDR server 42 also provides information about the amount of available bandwidth on those channels. In response to another query, provisioning system server 41 provides information to policy server 40 about the applications and services authorized for the subscriber A account, information about provisioned upstream and downstream bandwidth for the subscriber A account, etc. Application management server 43 provides information to policy server 40 regarding the network performance preferences and/or requirements of application X. In the current example, that information includes average expected data rate for application X, maximum burst data rate for application X, and jitter and latency requirements. Application management server 43 may also provide information to policy server 40 regarding load levels of game server 61. SNMP server 44 provides information to policy server 40 regarding any outages and regarding load levels and other conditions related to CMTS 11, routers 29, 32 and 37, and other elements of network 10.

With the received information from these various sources, policy server 40 determines that subscriber A is authorized to receive service X. Policy server 40 further determines that there is sufficient available bandwidth on the up- and downstream channels between AD/CM 15 and CMTS 11 to accommodate, within the limits of subscriber A's provisioned bandwidths, the requirements of application X and at least some of the requirements of applications Y and Z. Policy server 40 also determines that there is no conflict between policies associated with service X and other policies applicable to subscriber A. For example, policy server 40 may evaluate whether service X (which prioritizes data traffic for application X) would conflict with a policy requiring application Y or application Z to receive highest priority. Based on information from application management server 43 and SNMP server 44, policy server 40 may also determine whether the links in network 10 to game server 61 can satisfy the requirements of application X.

In response to these various determinations, policy server 40 communicates information regarding allocation of network 10 resources to various network elements. In particular, policy server 40 instructs PCMM server 45 that data for application X at CE/PC 16 should have higher priority than data for applications Y and Z so that the latency, jitter and other preferences associated with application X can be satisfied. PCMM server 45 then sends one or more Gate-Set request messages to CMTS 11. In response to those Gate-Set requests, CMTS 11 places downstream data for game X in a transmission queue having higher priority than queue(s) into which downstream data applications Y and Z are placed. CMTS 11 similarly gives a higher priority to application X and lower priority to applications Y and Z when granting upstream transmission opportunities to AD/CM 15. In some embodiments, policy server 40 could send instructions to DPI server 13 and/or other network elements (e.g., upstream routers) to cause some or all of the prioritization of application X data relative to data of applications Y and Z to be performed at DPI device 13 and/or another network element.

In some embodiments, and continuing the previous example, there may be a basic priority level applicable to user data traffic in an access network, and multiple additional priority levels that are successively higher than the basic priority. Based on application network performance information received from application management server 43 (i.e., the average expected data rate for application X, maximum burst data rate for application X, and jitter and latency requirements), policy server 40 selects the lowest of those multiple additional priorities that will satisfy the performance preferences for application X.

As another example of policy server 40 operation in response to various information inputs, assume that CE device 20 (FIG. 1) is a personal computer (PC) executing a bandwidth-intensive application such as a file sharing client ("application U"). Subscriber B, associated with cable modem access device (AD/CM) 19 through which CE/PC 20 communicates with network 10, has made arrangements with the operator of network 10 to receive a provisioned bandwidth augmentation service ("service U"). In particular, service U allows subscriber B to upload and/or download data at rates above the provisioned up- and downstream bandwidths for subscriber B if there is available channel capacity between AD/CM 19 and CMTS 11. When CE/PC 20 initially begins executing application U, one or more IP packets containing application U data are sent by CE/PC 20, via AD/CM 19, to CMTS 11. When those IP packets are received, DPI device 13 examines one or more fields in the headers and determines that the packets are associated with application U. DPI device 13 then communicates to policy server 40 that application U is executing on a device communicating through AD/CM 19. DPI device 13 may also inform policy server 40 of the specific device (CE/PC 20) on which application U is running.

Policy server 40 then queries IPDR server 42 and receives information regarding how much bandwidth is being consumed by other applications (if any) executing at CE devices associated with AD/CM 19 and/or subscriber B. IPDR server 42 also provides information about the amount of available bandwidth on the up- and downstream channels between AD/CM 19 and CMTS 11. Provisioning system server 41 provides information to policy server 40 about the applications and services authorized for the subscriber B account, information about provisioned upstream and downstream bandwidth for the subscriber B account, etc. Based on the information from DPI device 13, IPDR server 42 and provisioning system server 41, policy server 40 determines that subscriber B is authorized to receive service U. Policy server 40 further determines that providing service U to subscriber B will not conflict with another policy that might also apply to subscriber B. For example, a policy may require that total communication on an access network channel not exceed a certain percentage of maximum capacity. If data traffic from other access devices on a particular channel is sufficiently high, providing service U to subscriber B using that same channel might result in a policy conflict.

In the present example, policy server 40 determines that there is sufficient available bandwidth on the up- and/or downstream channels between AD/CM 19 and CMTS 11 to permit communication at a data rate above the provisioned up- and downstream bandwidths of subscriber B. Policy server 40 further determines that there are no other applications currently executing at CE/PC 20 or other subscriber B devices that require significant bandwidth. Based on these various determinations, policy server 40 further determines there is no policy conflict if service U is provided.

In response to these various determinations, policy server 40 communicates information regarding allocation of network 10 resources to PCMM server 45. In particular, policy server 40 instructs PCMM server 45 that data for application U at CE/PC 20 should be transmitted to (or received from) AD/CM 19 at a higher rate. PCMM server 45 then sends one or more Gate-Set request messages to CMTS 11 that cause CMTS 11 to transmit downstream application U data to AD/CM 19 at a higher than normal rate and/or to grant upstream transmission opportunities to AD/CM 19 for application U data at a higher than normal rate.

In some embodiments, the "U" column field in table 101 (FIG. 2A) may hold a value indicating how many times a subscriber has invoked application U in some preceding period (e.g., in the last 30 minutes). As part of its decision process, policy server 40 could then determine if the number of application U uses in the preceding period exceeds some maximum value. If application U has already been used the maximum number of times, policy server 40 could then determine that the subscriber will not be allowed to exceed provisioned bandwidth.

As yet another example of policy server 40 operation in response to various information inputs, assume that CE device 22 (FIG. 1) is a personal computer (PC) executing an arbitrary application requiring Internet access. CE device 23 at the same location is another PC also executing one or more applications requiring Internet access. One of the applications executing at CE/PC 23 may or may not be the same as the arbitrary application executing at CE/PC 22 (e.g., CE/PC 22 and CE/PC 23 may each be executing an instance of a web browser). Subscriber C, associated with cable modem access device (AD/CM) 21 through which CE/PC 22 and CE/PC 22 communicate with network 10, has made arrangements with the operator of network 10 to receive a service by which subscriber C is permitted to designate an application to be prioritized ("service S"). Although not shown in FIG. 2A, information about a subscriber account authorization for service S could be included in one or more additional columns of table 101. Service S allows an authorized subscriber to designate an application (or an application executing on a specific CE device) that is to be prioritized relative to other applications (or other application/device combinations) corresponding to the subscriber's account. This would, for example, permit one member of a family using a web browser on CE/PC 22 for business purposes to receive data transmission priority over other members of the family using the internet for recreational purposes.

CE/PC 22 could invoke service S in various manners. For example, a user of CE/PC 22 could invoke a separate service S application, input the identity of the application and CE device to be prioritized, and send a prioritization request message to network 10. That separate service S application would then be identified by DPI device 13 based on packet header information. A user could alternatively have previously identified the application and CE device to be prioritized (e.g., using a web portal of the network 10 operator). When a session with the prioritized application on the prioritized device is begun, the prioritized application and CE device are identified by DPI device 13 based on packet header information.

Upon receiving information from DPI server 13 indicating service S invocation by subscriber C, and based on information received from provisioning system server 41 indicating service S is authorized for subscriber C, policy server 40 determines that one or more applications at the subscriber C location (e.g., an application the subscriber has specified or an application on a CE device the subscriber has specified) should be prioritized relative to other applications executing on CE devices at the subscriber location. In response to these various determinations, policy server 40 communicates information regarding allocation of network 10 resources to PCMM server 45. In particular, policy server 40 instructs PCMM server 45 that data for the prioritized application at CE/PC 22 should be transmitted to (or received from) AD/CM 19 before data for other applications. PCMM server 45 then sends one or more Gate-Set request messages to CMTS 11 that cause CMTS 11 to transmit downstream data for the prioritized application to AD/CM 21 before sending data for other applications, and to grant upstream transmission opportunities to AD/CM 21 for the prioritized application before granting transmission opportunities for other applications and/or CE devices.

Service S could be implemented in various manners. For example, a single service flow could be assigned to AD/CM 21, with data for each application executing on PC/CE 22 and PC/CE 23 queued differently based on its priority. Service S could also be implemented by assigning separate service flows for PC/CE 22 and PC/CE 23, with the service flow for PC/CE 22 having a higher priority than the service flow assigned to PC/CE 23. A separate service flow for PC/CE 22 could also be assigned a guaranteed bandwidth.

Figure 4:
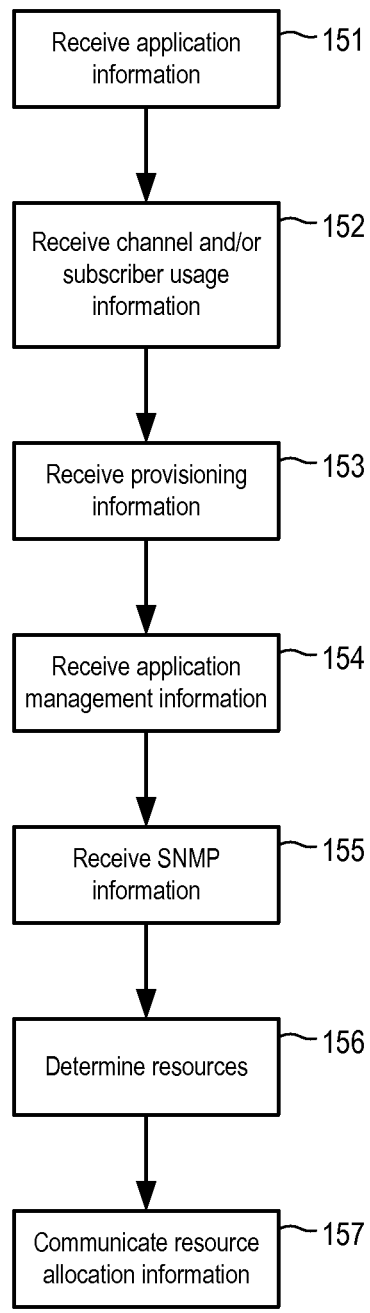
FIG. 4 is a flow chart explaining operation of a policy server, according to at least some embodiments, to manage network resources.

FIG. 4 is a flow chart explaining operation of policy server 40, according to at least some embodiments, to manage network resources. The algorithm of FIG. 4 is carried out by one or more processors of policy server 19 according to instructions stored in a memory of policy server 40 as executable code and/or according to hardwired logic instructions within the processor(s) of policy server 40. Multiple instances of the algorithm of FIG. 4 are simultaneously performed by policy server 40 with regard to different subscriber accounts in network 10. Beginning in block 151, policy server 40 receives information from a DPI device about an application executing at a CE device corresponding to a subscriber account. In block 152, policy server 40 receives information from an IPDR server or other source regarding usage of communication carrying capacity (bandwidth) in access network channel(s) by devices corresponding to that subscriber account. In block 153, policy server 40 receives provisioning information regarding that subscriber account (e.g., information about authorized services for the subscriber). In block 154, policy server 40 receives information from an application management server or other source regarding network performance requirements and/or preferences for the application about which information was received in block 151. In block 155, policy server 40 receives information from an SNMP server and/or other sources regarding other network conditions.

In block 156, based on information received in blocks 151 through 155, policy server 40 determines whether any network resources should be allocated, and if so, what that allocation should be. For example, and as indicated above, policy server 40 may determine if a subscriber is authorized to receive a particular service. Policy server 40 may also determine if providing a particular service to the subscriber would require implementing a policy that could conflict with another policy applicable to the subscriber. Illustrations of such determinations are provided above in connection with previous examples. As but another example, policy server 40 might determine that a user at a subscriber's CE device is currently executing a first application that requires a first amount of bandwidth and is seeking to use a second application requiring a second amount of bandwidth, but that the combined first and second bandwidth requirements exceed a maximum available bandwidth.

In block 157, policy server 157 communicates information to other devices regarding network resource allocation. In some cases, and as described in connection with previous examples, those communications may include instructions to a PCMM server, an active DPI device and/or other devices so as to prioritize certain data communications to the subscriber and/or to increase bandwidth available to the subscriber. In some cases, the communication in block 157 may be a notification to a subscriber's CE device that a requested service will not be allowed (e.g., because of a policy conflict).

All operations shown in FIG. 4 will not be performed in every case. For example, some services may not require policy server 40 to obtain information regarding bandwidth consumption from an IPDR server or other source, and block 152 is skipped. Other blocks in the algorithm of FIG. 4 can be skipped in other cases.

Figure 5:
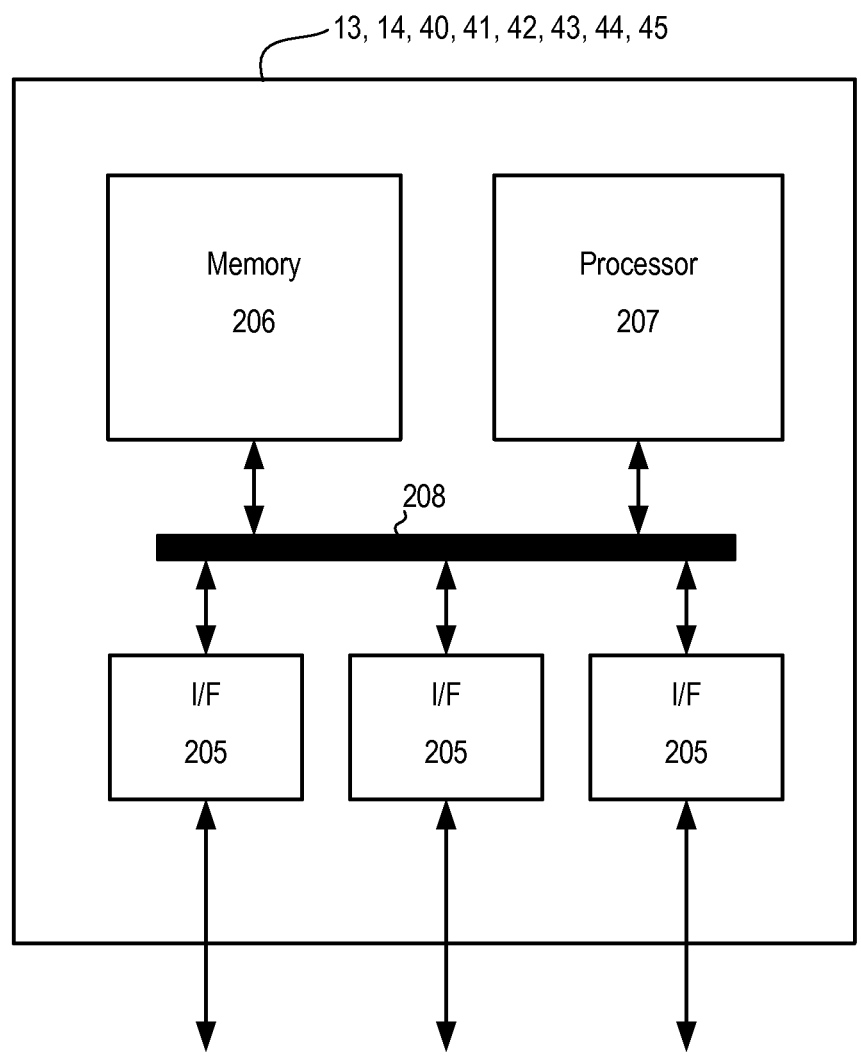
FIG. 5 is a partially schematic block diagram of a computing platform according to at least some embodiments.

In at least some embodiments, each of policy server 40, provisioning system server 41, IPDR server 42, application management server 43, SNMP server 44, PCMM server 45, DPI device 13 and DPI device 14 can be implemented as multiple computing platforms for redundancy and/or to increase the amount of analysis, data storage and other operations being performed simultaneously. FIG. 5 is a partially schematic block diagram of a computing platform that can act as one of policy server 40, provisioning system server 41, IPDR server 42, application management server 43, SNMP server 44, PCMM server 45, DPI device 13 or DPI device 14. The computing platform includes one or more hardware interfaces 205 that provide physical connections by which the computing platform communicates with other devices in network 10. In at least some embodiments, hardware interfaces 205 include one or more Ethernet cards. The computing platform further includes memory 206 for storing instructions and data and a processor 207 for executing instructions and controlling operation of the computing platform. Although a single block is shown for memory 206 and a single block shown for processor 207, memory and computational operations of the computing platform could respectively be distributed across multiple memory devices and multiple processors located within the computing platform and/or across memory and processors located on multiple platforms. Memory 206 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 207 may be implemented with any of numerous types of devices, including but not limited to one or more general purpose microprocessors, one or more application specific integrated circuits, one or more field programmable gate arrays, and combinations thereof. In at least some embodiments, processor 207 carries out operations described herein according to machine readable instructions stored in memory 206 and/or stored as hardwired logic gates within processor 207. Processor 207 communicates with and controls memory 206 and interfaces 205 over one or more buses 208.

Embodiments of the invention include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a server or other network device to carry out operations such as are described herein. As used herein (including the claims), a machine-readable storage medium is a physical structure that can be touched by a human. A modulated signal would not by itself constitute a machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the invention.

The invention claimed is:

1. A method comprising:
receiving activity data for an account associated with a user, the account corresponding to an access device in a network, the activity data indicating at least a first application program and a second application program respectively executed by a first data processing device and a second data processing device;
receiving information for the account, the information including prioritization information related to the first application program and the second application program;
determining, based at least in part on the activity data and the prioritization information, that data communications in the network and for the first application program should have higher priority than data communications in the network for the second application program;
sending, to a network device, one or more instructions configured to cause the network device to place data associated with the first application program in a first transmission queue and to place data associated with the second application program in a second transmission queue, wherein the first transmission queue has a higher priority than the second transmission queue;
receiving additional activity data for an additional account of an additional user, the additional account corresponding to an additional access device in the network, the additional account further corresponding to an additional data processing device, the additional activity data indicating at least data related to execution on the additional data processing device of an additional application program communicating via the additional access device;
receiving additional information for the additional account, the additional information indicating at least one of multiple network usage policies applicable to the additional account, wherein at least two of the multiple network usage policies conflict if implemented simultaneously;
determining, based at least in part on the additional activity data and the additional information, that the at least one of the multiple network usage policies can be implemented without causing a conflict; and
communicating information regarding allocation of network resources so as to implement the at least one of the multiple network usage policies.

2. The method of claim 1, wherein the prioritization information comprises a user preference for the first application program, further comprising receiving the user preference via a web portal.

3. The method of claim 1, wherein
the access device comprises a cable modem,
the network comprises a cable modem termination system and a plurality of additional cable modems respectively corresponding to additional user accounts, and
at least one of the first data processing device and the second data processing device is a computer configured to communicate via the network.

4. An apparatus comprising:
at least one processor; and
memory storing instructions that, when executed by the at least one processor, cause the apparatus to:
receive activity data for an account associated with a user, the account corresponding to an access device in a network, the activity data indicating a first application program and a second application program respectively executed by a first data processing device and a second data processing device;
receive information for the account, the information including prioritization information related to the first application program and the second application program;
determine, based at least in part on the activity data and the prioritization information, that data communications in the network and for the first application program should have higher priority than data communications in the network and for the second application program;
send, to a network device, one or more instructions configured to cause the network device to place data associated with the first application program in a first transmission queue and to place data associated with the second application program in a second transmission queue, wherein the first transmission queue has a higher priority than the second transmission queue;
receive additional activity data for an additional account of an additional user, the additional account corresponding to an additional access device in the network, the additional account further corresponding to an additional data processing device, the additional activity data indicating at least data related to execution on the additional data processing device of an additional application program communicating via the additional access device;
receive additional information for the additional account, the additional information indicating at least one of multiple network usage policies applicable to the additional account, wherein at least two of the multiple network usage policies conflict if implemented simultaneously;
determine, based at least in part on the additional activity data and the additional information, that the at least one of the multiple network usage policies can be implemented without causing a conflict; and
communicate information regarding allocation of network resources so as to implement the at least one of the multiple network usage policies.

5. The apparatus of claim 4, wherein
the access device comprises a cable modem,
the network comprises a cable modem termination system and a plurality of additional cable modems respectively corresponding to additional user accounts, and
at least one of the first data processing device and the second data processing device is a computer configured to communicate via the network.

6. An apparatus comprising:
at least one processor; and
memory storing instructions that, when executed by the at least one processor, cause the apparatus to:
receive activity data for an account associated with a user, the account corresponding to an access device in a network, the account further corresponding to a first data processing device and a second data processing device, the activity data containing header information extracted from packets received at the access device;
determine, based on a comparison of the header information to a plurality of application signatures, that a first application program and a second application program respectively executed by the first data processing device and the second data processing device are active;
receive information for the account, the information including prioritization information related to the first application program and the second application program;
prioritize, based at least in part on the activity data and the prioritization information, data communications in the network and for the first application program;
receive additional activity data for an additional account of an additional user, the additional account corresponding to an additional access device in the network, the additional account further corresponding to an additional data processing device, the additional activity data indicating at least data related to execution on the additional data processing device of an additional application program communicating via the additional access device;
receive additional information for the additional account, the additional information indicating at least one of multiple network usage policies applicable to the additional account, wherein at least two of the multiple network usage policies conflict if implemented simultaneously;
determine, based at least in part on the additional activity data and the additional information, that the at least one of the multiple network usage policies can be implemented without causing a conflict; and
communicate information regarding allocation of network resources so as to implement the at least one of the multiple network usage policies.

7. The apparatus of claim 6, wherein the memory stores additional instructions, that when executed, cause the apparatus to:
receive bandwidth information indicative of an amount of network channel information-carrying capacity consumed by the additional access device, and
wherein the determining that the at least one of the multiple network usage policies can be implemented without causing the conflict is further based on the bandwidth information.

8. The apparatus of claim 6, wherein the memory stores additional instructions, that when executed, cause the apparatus to receive application performance information indicative of network performance levels applicable to the additional application program, and
wherein the determining that the at least one of the multiple network usage policies can be implemented without causing the conflict is further based on the application performance information.

9. The apparatus of claim 6, wherein the instructions that cause the apparatus to communicate the information regarding allocation further cause the apparatus to communicate information indicative that data communications in the network relating to the additional application program should have higher priority than data communications for one or more other application programs executed by the additional data processing device.

10. The apparatus of claim 6, wherein the instructions that cause the apparatus to communicate the information regarding allocation further cause the apparatus to communicate information indicative that data communications in the network relating to the additional application program should be assigned a guaranteed bandwidth.

11. The apparatus of claim 6, wherein the memory stores further instructions, that when executed, cause the apparatus to:
receive second additional activity data for the additional account of the additional user, the second additional activity data indicating at least data related to execution of third and fourth application programs on the additional data processing device,
receive second additional information for the additional account,
receive application performance information indicative of network performance levels applicable to the third application program, and
determine, based at least in part on the second additional activity data, the second additional information and the application performance information, that data communications in the network for the third application program should have higher priority than data communications in the network for the fourth application program.

12. The apparatus of claim 11, wherein
the access device comprises a cable modem,
the network comprises a cable modem termination system and a plurality of additional cable modems respectively corresponding to other additional accounts, and
at least one of the first data processing device and the second data processing device is a computer configured to communicate via the network.

13. The apparatus of claim 6, wherein the apparatus is part of a system that includes the access device, the network and the first data processing device and the second data processing device.

14. An apparatus comprising:
at least one processor; and
memory storing instructions that, when executed by the at least one processor, cause the apparatus to:
receive activity data for an account of a user, the account corresponding to at least one access device in a network, the account further corresponding to at least one data processing device communicating through the access device, the activity data indicating at least data related to a first application program and a second application program executed by the at least one data processing device, receive information for the account, the information including prioritization information related to the first application program and the second application program, determine, based at least in part on the activity data and the received information, that data communications in the network for the first application program should have higher priority than data communications in the network for the second application program, receive additional activity data for an additional account of an additional user, the additional account corresponding to an additional access device in the network, the additional account further corresponding to an additional data processing device, the additional activity data indicating at least data related to execution on the additional data processing device of an additional application program communicating via the additional access device, receive additional information for the additional account, the additional information indicating at least one of multiple network usage policies applicable to the additional account, wherein at least two of the multiple network usage policies conflict if implemented simultaneously, and determine, based at least in part on the additional activity data and the additional information, that the at least one of the multiple network usage policies can be implemented without causing a conflict.

15. The apparatus of claim 14, wherein the memory stores further instructions, that when executed, cause the apparatus to:

receive bandwidth information indicative of an amount of network channel information-carrying capacity consumed by the additional access device, and wherein the determining that the at least one of the multiple network usage policies can be implemented without causing the conflict is further based on the bandwidth information.

16. The apparatus of claim 14, wherein the memory stores further instructions, that when executed, cause the apparatus to:

receive application performance information indicative of network performance levels applicable to the additional application program, and wherein the determining that the at least one of the multiple network usage policies can be implemented without causing the conflict is further based on the application performance information.

17. The apparatus of claim 14, wherein the memory stores further instructions, that when executed, cause the apparatus to communicate information regarding allocation of network resources so as to implement the at least one of the multiple network usage policies.

18. The apparatus of claim 17, wherein the instructions that cause the apparatus to communicate the information regarding the allocation of network resources, further cause the apparatus to communicate information indicating that data communications in the network relating to the additional application program should have higher priority than data communications for one or more other application programs executed by the additional data processing device.

19. The apparatus of claim 17, wherein the instructions that cause the apparatus to communicate the information regarding the allocation of network resources, further cause the apparatus to communicate information indicating that data communications in the network relating to the additional application program should be assigned a guaranteed bandwidth.

20. The apparatus of claim 14, wherein the instructions that cause the apparatus to receive additional activity data further cause the apparatus to:

receive data packets sent by the additional access device, inspect headers of the data packets, compare information in the inspected headers to one or more application signature files, and determine the additional application program based on a result of the comparison of the information in the inspected headers to the one or more application signature files.

* * * * *

UNITED STATES PATENT AND TRADEMARK OFFICE
CERTIFICATE OF CORRECTION

PATENT NO. : 10,263,860 B2
APPLICATION NO. : 13/170245
DATED : April 16, 2019
INVENTOR(S) : Woundy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this
Nineteenth Day of May, 2020

Andrei Iancu
*Director of the United States Patent and Trademark Office*